United States Patent
Lyren

(10) Patent No.: US 11,323,836 B2
(45) Date of Patent: *May 3, 2022

(54) METHOD THAT EXPEDITES PLAYING SOUND OF A TALKING EMOJI

(71) Applicant: Philip Scott Lyren, Bangkok (TH)

(72) Inventor: Philip Scott Lyren, Bangkok (TH)

( * ) Notice: Subject to any disclaimer, the term of this patent is extended or adjusted under 35 U.S.C. 154(b) by 0 days.

This patent is subject to a terminal disclaimer.

(21) Appl. No.: 17/062,635

(22) Filed: Oct. 5, 2020

(65) Prior Publication Data

US 2021/0021948 A1 Jan. 21, 2021

Related U.S. Application Data

(63) Continuation of application No. 15/955,875, filed on Apr. 18, 2018, now Pat. No. 10,798,510.

(51) Int. Cl.
*H04S 3/00* (2006.01)
*H04S 1/00* (2006.01)
*H04L 51/10* (2022.01)
*G10L 19/008* (2013.01)

(52) U.S. Cl.
CPC ............ *H04S 3/008* (2013.01); *G10L 19/008* (2013.01); *H04L 51/10* (2013.01); *H04S 1/002* (2013.01); *H04S 2420/01* (2013.01)

(58) Field of Classification Search
CPC ...... H04S 3/008; H04S 1/002; H04S 2420/01; H04S 1/005; H04S 7/303; H04R 5/02; H04R 5/04; H04R 2499/11; G06F 3/04817
USPC .................................. 381/17, 307, 309–310
See application file for complete search history.

(56) References Cited

U.S. PATENT DOCUMENTS

| | | | |
|---|---|---|---|
| 8,093,485 B2 * | 1/2012 | Lin | G10H 7/006 84/604 |
| 9,820,074 B2 * | 11/2017 | Atkins | G06F 3/0673 |
| 2017/0083999 A1 * | 3/2017 | Saurabh | G06T 1/60 |
| 2017/0295446 A1 * | 10/2017 | Thagadur Shivappa | H04S 7/304 |

* cited by examiner

*Primary Examiner* — Disler Paul

(57) ABSTRACT

A method expedites playing sound of a talking emoji from a first person with a first portable electronic device (PED) to a second person with a second PED. The second PED receives the talking emoji in mono sound and convolves the mono sound into binaural sound before receiving a request to play the sound to the second user. The second PED then plays the sound of the talking emoji in binaural sound after receiving the request from the second user.

20 Claims, 5 Drawing Sheets

METHOD THAT EXPEDITES PLAYING SOUND OF A TALKING EMOJI

BACKGROUND

Three-dimensional (3D) sound localization offers people a wealth of new technological avenues to not merely communicate with each other but also to communicate with electronic devices, software programs, and processes.

As this technology develops, challenges will arise with regard to how sound localization integrates into the modern era. Example embodiments offer solutions to some of these challenges and assist in providing technological advancements in methods and apparatus using 3D sound localization.

SUMMARY

Figure 1:
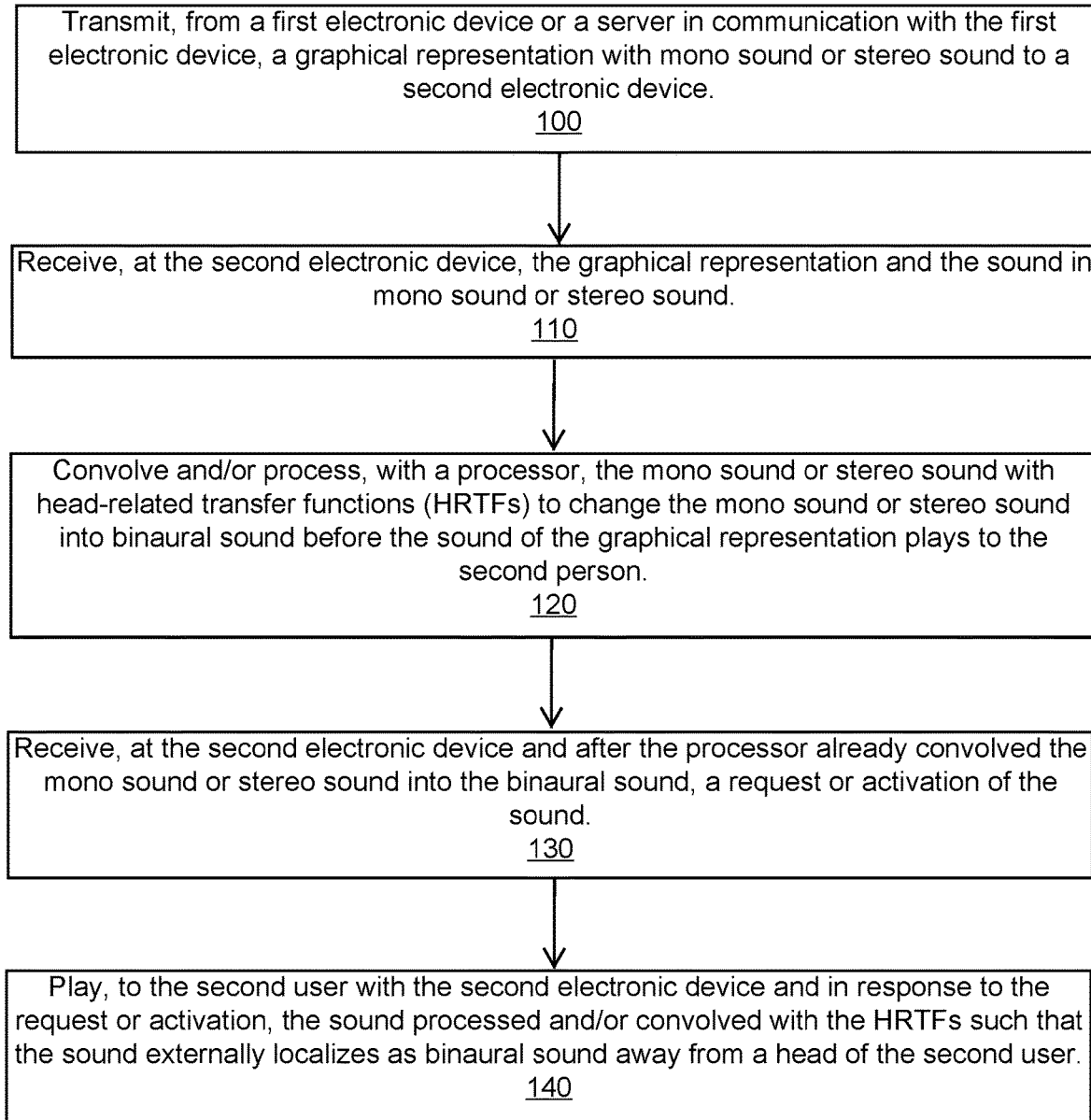
FIG. 1 is a method that expedites playing sound of a graphical representation sent from a first person with a first portable electronic device (PED) to a second person with a second PED in accordance with an example embodiment.

Example embodiments include methods and apparatus that expedite processing and/or playing of binaural sound to a listener.

During an electronic communication between a first user and a second user, an electronic device processes or convolves sound into binaural sound for the second user before the second user requests the sound to be heard. In this way, processing or playing of binaural sound is expedited since the binaural sound is already convolved and ready to play when the second user is ready to hear the sound.

Other example embodiments are discussed herein.

DETAILED DESCRIPTION

Binaural sound or three-dimensional (3D) sound externally localizes away from a head of the listener, unlike stereo or mono sound that localizes inside the head of the listener or localizes to a physical sound speaker. Thus, when a listener hears binaural sound, a source or location of the sound occurs outside the head of the listener even though this location may be in empty space or space not occupied with a physical sound speaker or loud speaker.

Binaural sound has many technical challenges and problems, especially when users exchange or play binaural sound during an electronic communication. Example embodiments offer solutions to these challenges and problems.

One problem during an electronic communication is that processing or convolving sound with head-related transfer functions (HRTFs) is process intensive. Electronic devices often use a dedicated or specialized processor, such as a digital signal processor (DSP), to perform the task of convolving sound into binaural sound. This task can be especially process intensive if the head of the listener is moving, the sound is moving with respect to the listener, or the sound must be repeatedly convolved with different pairs of HRTFs. If the processor in the electronic device cannot convolve the sound quickly enough, the sound the listener hears may appear delayed or jumpy and ultimately diminish the experience of hearing binaural sound.

Further yet, convolving sound with HRTFs is time-consuming. If a user activates playing of 3D sound, the user must wait while the processor convolves the sound into binaural sound. This process can delay playing the sound to the user.

Example embodiments solve these problems and others.

In one example embodiment, a method expedites playing sound of a graphical representation sent or provided from a first person with a first portable electronic device (PED) to a second person with a second PED. The graphical representation includes sound (such as a sound clip, sound file, or audio file) that plays to the second person. The second PED receives the graphical representation and the sound in mono sound or stereo sound and convolves this sound into binaural sound before receiving a request to play the sound to the second person. This convolution occurs in anticipation of the sound being played to the second person at a future point in time. When the second person subsequently activates the graphical representation or otherwise plays the sound received from the first person, the sound immediately or instantly plays as binaural sound since the sound was already convolved into the binaural sound before the request or before activation of the graphical representation. As such, the second person does not have to wait while a processor (such as a DSP) convolves the sound from mono or stereo sound into binaural sound since the sound was already convolved and stored on the electronic device of the second person. Processing or convolving the sound before the sound is requested expedites playing of the sound to the second person and enhances the user experience listening to binaural sound.

Consider another example in which the electronic device of the person downloads or receives sound in mono sound or stereo sound. This sound is not yet convolved into binaural sound. With a conventional technique, the electronic device would not convolve the sound until it is actually requested (e.g., at a point in time when a user requests to hear the sound or a software program elects to play the sound to the user). Convolving the sound at this time, however, is process intensive and time-consuming. Instead, an example embodiment convolves the sound before the sound is actually needed for playback or before the user or software program requests the sound. By convolving the sound earlier before it is needed or requested, the sound plays immediately upon request. No time delay occurs since the convolution is already complete, and the sound is available and ready for immediate playing to the listener.

An example embodiment predicts or anticipates that the listener will request to hear the sound as binaural sound at a point in time in the future. By convolving the sound before this point in time, example embodiments expedite playing and/or processing of the sound when the sound is actually requested for play. In this way, the binaural sound is already convolved and ready to play upon activation (e.g., when a user activates a graphical representation that includes sound or activates a sound file or sound clip). This process expedites playing of the binaural sound at the electronic device of the user since this electronic device is not required to convolve the sound into binaural sound at the point in time when the user hears the sound. The binaural sound stored in the electronic device is ready for immediate play at the electronic device of the user.

Example embodiments also expedite playing of binaural sound by prefetching, decrypting, caching, and/or storing multiple versions of the sound as discussed herein.

FIG. 1 is a method that expedites playing sound of a graphical representation sent from a first person with a first portable electronic device (PED) to a second person with a second PED in accordance with an example embodiment.

Block 100 states transmit, from a first electronic device or a server in communication with the first electronic device, a graphical representation with mono sound or stereo sound to a second electronic device.

The first electronic device or the server transmits the graphical representation and sound over one or more wired or wireless networks (e.g., a cellular network, the internet, etc.) to the second electronic device. For example, the first electronic device or server includes a wireless transmitter/receiver that sends the graphical representation and sound.

Consider an example in which a first user commands or instructs a sound clip to play to a second user during an electronic communication between the first and second users. For example, the first and second users are talking in a telephone call and/or exchanging text messages. In response to this command or instruction, the first electronic device transmits the sound clip and a graphical representation to the second electronic device.

In another example embodiment, a server or another electronic device transmits the sound to the second electronic device. Consider an example in which the first and second users talk or message each other with a mobile messaging software application. The application executes on the electronic devices and one or more servers. When the first user clicks on a 3D sound emoji, this action causes one of the servers or electronic devices to transmit the 3D emoji and sound to the second electronic device.

Block 110 states receive, at the second electronic device, the graphical representation and the sound in mono sound or stereo sound.

The second electronic device receives the graphical representation and sound from the first electronic device or another electronic device (e.g., a server) in communication with the first electronic. For example, the second electronic device includes a wireless transmitter/receiver that receives the sound over one or more networks.

Block 120 states convolve and/or process, with a processor, the mono sound or stereo sound with head-related transfer functions (HRTFs) to change the mono sound or stereo sound into binaural sound before the sound of the graphical representation plays to the second person.

The processor, processors, or processing unit processes or convolves the sound before the second person, an electronic device, or a software program activates the sound to play to the second person. Convolution occurs before the sound plays to the second person so the second person hears the sound as binaural sound and not as mono sound or stereo sound as received from the first electronic device.

For example, a processor (such as a DSP) processes or convolves the sound with one or more of head-related transfer functions (HRTFs), head-related impulse responses (HRIRs), room impulse responses (RIRs), room transfer functions (RTFs), binaural room impulse responses (BRIRs), binaural room transfer functions (BRTFS), interaural time delays (ITDs), interaural level differences (ITDs), and a sound impulse response.

An example embodiment processes or convolves the sound with the HRTFs after the sound is provided to the electronic device of the second user but before the second user hears the sound or requests to hear the sound. This expedites processing and/or playing of the sound to the second user since the second user does not have to wait while a processor processes or convolves the sound into binaural sound when the second user subsequently makes a request to hear the sound.

Sound includes, but is not limited to, one or more of stereo sound, mono sound, binaural sound, computer-generated sound, sound captured with microphones, and other sound. Furthermore, sound includes different types including, but not limited to, music, background sound or background noise, human voice, computer-generated voice, and other naturally occurring or computer-generated sound.

When the sound is recorded or generated in mono sound or stereo sound, convolution changes the sound to binaural sound. For example, one or more microphones record a human person speaking in mono sound or stereo sound, and a processor processes this sound with filters to change the sound into binaural sound.

The processor or sound hardware processing or convolving the sound can be located in one or more electronic devices or computers including, but not limited to, headphones, smartphones, tablet computers, electronic speakers, head mounted displays (HMDs), optical head mounted displays (OHMDs), electronic glasses (e.g., glasses that provide augmented reality (AR)), servers, portable electronic devices (PEDs), handheld portable electronic devices (HPEDs), wearable electronic devices (WEDs), and other portable and non-portable electronic devices. These electronic devices can also be used to execute example embodiments.

In one example embodiment, the DSP is located in the electronic device of the second user. In other example embodiments, the DSP is located in other electronic devices, such as a server in communication with the first and second electronic devices.

The DSP processes or convolves stereo sound or mono sound with a process known as binaural synthesis or binaural processing to provide the sound with sound localization cues (ILD, ITD, and/or HRTFs) so the listener externally localizes the sound as binaural sound or 3D sound.

An example embodiment models the HRTFs with one or more filters, such as a digital filter, a finite impulse response (FIR) filter, an infinite impulse response (IIR) filter, etc. Further, an ITD can be modeled as a separate delay line.

When the binaural sound is not captured (e.g., on a dummy head or human head), the captured sound is convolved with sound localization information (SLI). This information includes one or more of HRTFs, HRIRs, BRTFs, BRIRs, ILDs, ITDs, and/or other information discussed herein. By way of example, SLI are retrieved, obtained, or received from memory, a database, a file, an electronic device (such as a server, cloud-based storage, or another electronic device in the computer system or in communication with a PED providing the sound to the user through one or more networks), etc. Instead of being retrieved from memory, this information can also be calculated in real-time.

A central processing unit (CPU), processor (such as a DSP), or microprocessor processes and/or convolves the sound with the SLI, such as a pair of head related transfer functions (HRTFs), ITDs, and/or ILDs so that the sound will localize to a zone, area, or sound localization point (SLP). For example, the sound localizes to a specific point (e.g., localizing to point (r, θ, φ)) or a general location or area (e.g., localizing to far-field location (θ, φ) or near-field location (θ, φ)). As an example, a lookup table that stores a set of HRTF pairs includes a field/column that specifies the coordinates associated with each pair, and the coordinates indicate the location for the origination of the sound. These coordinates include a distance (r) or near-field or far-field designation, an azimuth angle (θ), and/or an elevation angle (φ).

The complex and unique shape of the human pinnae transforms sound waves through spectral modifications as the sound waves enter the ear. These spectral modifications are a function of the position of the source of sound with respect to the ears along with the physical shape of the pinnae that together cause a unique set of modifications to the sound called head related transfer functions or HRTFs. A unique pair of HRTFs (one for the left ear and one for the right ear) can be modeled or measured for each position of the source of sound with respect to a listener as the customized HRTFs.

A HRTF is a function of frequency (f) and three spatial variables, by way of example (r, θ, φ) in a spherical coordinate system. Here, r is the radial distance from a recording point where the sound is recorded or a distance from a listening point where the sound is heard to an origination or generation point of the sound; θ (theta) is the azimuth angle between a forward-facing user at the recording or listening point and the direction of the origination or generation point of the sound relative to the user; and φ (phi) is the polar angle, elevation, or elevation angle between a forward-facing user at the recording or listening point and the direction of the origination or generation point of the sound relative to the user. By way of example, the value of (r) can be a distance (such as a numeric value) from an origin of sound to a recording point (e.g., when the sound is recorded with microphones) or a distance from a SLP to a head of a listener (e.g., when the sound is generated with a computer program or otherwise provided to a listener).

When the distance (r) is greater than or equal to about one meter (1 m) as measured from the capture point (e.g., the head of the person) to the origination point of a sound, the sound attenuates inversely with the distance. One meter or thereabout defines a practical boundary between near-field and far-field distances and corresponding HRTFs. A "near-field" distance is one measured at about one meter or less; whereas a "far-field" distance is one measured at about one meter or more. Example embodiments are implemented with near-field and far-field distances.

The coordinates for external sound localization can be calculated or estimated from an interaural time difference (ITD) of the sound between two ears. ITD is related to the azimuth angle according to, for example, the Woodworth model that provides a frequency independent ray tracing methodology. The coordinates (r, θ, φ) for external sound localization can also be calculated from a measurement of an orientation of and a distance to the face of the person when a head related impulse response (HRIR) is captured.

The coordinates can also be calculated or extracted from one or more HRTF data files, for example by parsing known HRTF file formats, and/or HRTF file information. For example, HRTF data is stored as a set of angles that are provided in a file or header of a file (or in another predetermined or known location of a file or computer readable medium). The data can include one or more of time domain impulse responses (FIR filter coefficients), filter feedback coefficients, and an ITD value. This information can also be referred to as "a" and "b" coefficients. By way of example, these coefficients are stored or ordered according to lowest azimuth to highest azimuth for different elevation angles. The HRTF file can also include other information, such as the sampling rate, the number of elevation angles, the number of HRTFs stored, ITDs, a list of the elevation and azimuth angles, a unique identification for the HRTF pair, and other information. The data can be arranged according to one or more standard or proprietary file formats, such as AES69, and extracted from the file.

The coordinates and other HRTF information can be calculated or extracted from the HRTF data files. A unique set of HRTF information (including r, θ, φ) is determined for each unique HRTF.

The coordinates and other HRTF information are also stored in and retrieved from memory, such as storing the information in a look-up table. The information is quickly retrieved to enable real-time processing and convolving of sound using HRTFs and hence improves computer performance of execution of binaural sound.

The SLP represents a location where a person will perceive an origin of the sound. For an external localization, the SLP is away from the person (e.g., the SLP is away from but proximate to the person or away from but not proximate to the person). The SLP can also be located inside the head of the person (e.g., when the sound is provided as mono sound or stereo sound). Sound can also switch between externally localizing and internally localizing, such as appearing to move and pass through a head of a listener.

SLI can also be approximated or interpolated based on known data or known SLI, such as SLI for other coordinate locations. For example, a SLP is desired to localize at coordinate location (2.0 m, 0°, 40°), but HRTFs for the location are not known. HRTFs are known for two neighboring locations, such as known for (2.0 m, 0°, 35°) and (2.0 m, 0°, 45°), and the HRTFs for the desired location of (2.0 m, 0°, 40°) are approximated from the two known locations. These approximated HRTFs are provided to convolve sound to localize at the desired coordinate location (2.0 m, 0°, 40°).

Sound is convolved either directly in the time domain with a finite impulse response (FIR) filter or with a Fast Fourier Transform (FFT). For example, an electronic device convolves the sound to one or more SLPs using a set of HRTFs, HRIRs, BRIRs, or RIRs and provides the person with binaural sound.

In an example embodiment, convolution involves an audio input signal and one or more impulse responses of a sound originating from various positions with respect to the listener. The input signal is a limited length audio signal (such as a pre-recorded digital audio file or sound clip) or an ongoing audio signal (such as sound from a microphone or streaming audio over the Internet from a continuous source). The impulse responses are a set of HRIRs, BRIRs, RIRs, etc.

Convolution applies one or more FIR filters to the input signals and convolves the input signals into binaural audio output or binaural stereo tracks. For example, the input signals are convolved into binaural audio output that is specific or individualized for the listener based on one or more of the impulse responses to the listener.

The FIR filters are derived binaural impulse responses. Alternatively or additionally, the FIR filters are obtained from another source, such as generated from a computer simulation or estimation, generated from a dummy head, retrieved from storage, computed based on known impulse responses captured from people, etc. Further, convolution of an input signal into binaural output can include sound with one or more of reverberation, single echoes, frequency coloring, and spatial impression.

Processing of the sound also includes calculating and/or adjusting an interaural time difference (ITD), an interaural level difference (ILD), and/or other aspects of the sound in order to alter the cues and artificially alter the point of localization. Consider an example in which the ITD is calculated for a location ($\theta$, $\phi$) with discrete Fourier transforms (DFTs) calculated for the left and right ears. The ITD is located at the point for which the function attains its maximum value, known as the argument of the maximum or arg max as follows:

$$ITD = \arg\max(\tau) \sum_n d_{l,\theta,\phi}(n) \cdot d_{r,\theta,\phi}(n+\tau).$$

Subsequent sounds are filtered with the left HRTF, right HRTF, and/or ITD so that the sound localizes at (r, $\theta$, $\phi$). Such sounds include filtering stereo and monaural sound to localize at (r, $\theta$, $\phi$). For example, given an input signal as a monaural sound signal s(n), this sound is convolved to appear at ($\theta$, $\phi$) when the left ear is presented with:

$$s_l(n)=s(n-ITD) \cdot d_{l,\theta,\phi}(n);$$

and the right ear is presented with:

$$s_r(n)=S(n) \cdot d_{r,\theta,\phi}(n).$$

Consider an example in which a dedicated digital signal processor (DSP) executes frequency domain processing to generate real-time convolution of monophonic sound to binaural sound.

By way of example, a continuous audio input signal x(t) is convolved with a linear filter of an impulse response h(t) to generate an output signal y(t) as follows:

$$y(\tau) = x(\tau) \cdot h(\tau) = \int_0^\infty x(\tau-t) \cdot h(t) \cdot dt.$$

This reduces to a summation when the impulse response has a given length N and the input signal and the impulse response are sampled at t=iDt as follows:

$$y(i) = \sum_{j=0}^{N-1} x(i-j) \cdot h(j).$$

Execution time of convolution further reduces with a Fast Fourier Transform (FFT) algorithm and/or Inverse Fast Fourier Transform (IFFT) algorithm.

Consider another example of binaural synthesis in which recorded or synthesized sound is filtered with a binaural impulse response (e.g., HRIR or BRIR) to generate a binaural output sound to the person. The input sound is pre-processed to generate left and right audio streams that are mapped to one or more sound sources or sound localization points (known as SLPs). These streams are convolved with a binaural impulse response for the left ear and the right ear to generate the left and right binaural output sound signal. The output sound signal is further processed depending on a final destination. For example, a cross-talk cancellation algorithm is applied to the output sound signal when it will be provided through loudspeakers or applying artificial binaural reverberation to provide 3D spatial context to the sound.

Block 130 states receive, at the second electronic device and after the processor already convolved the mono sound or stereo sound into the binaural sound, a request or activation of the sound.

The second user, an electronic device, or a software program activates the graphical representation and/or plays the binaural sound to the second user. For example, the second user requests or activates the graphical representation and/or sound after the sound was already convolved. For instance, the second user clicks on the graphical representation, issues a voice command to play the sound or activate the graphical representation, uses a mouse or pointer to activate or play the sound, commands or instructs a software program to activate or play the sound, issues body gesture (e.g., hand gesture, eye movement, etc.), etc. Activation or playing of the sound can occur in other ways as well. For example, the sound plays when the second person views the graphical representation, opens or enlarges a window, or opens a software program. For example, the sound plays upon occurrence of another event, such as playing at a certain time of day, playing when the user proceeds to a geographical or internet of things (IoT) location, the user enters a virtual space, the user focuses a window, the user dons a PED, the user activates a program, the user turns on or awakes from sleep an electronic device, or other events discussed herein.

Block 140 states play, to the second user with the second electronic device and in response to the request or activation, the sound processed and/or convolved with the HRTFs such that the sound externally localizes as binaural sound away from a head of the second user.

The sound plays to the listener as binaural sound that externally localizes away from or outside of the head of the listener. For example, headphones or earphones provide this sound at one or more sound localization points (SLPs).

Consider an example in which a first user sends a graphical representation and mono sound to an electronic device of a second user. Before the sound arrives at the electronic device of the second user, the sound transmits to a server. The server convolves the mono sound into binaural sound and transmits this convolved sound to the electronic device of the second user.

Consider an example in which the first user desires to send a graphical representation and sound to the electronic device of the second user. The graphical representation and/or sound are also stored on a server which also stores or has access to the HRTFs of the second user. The server convolves the sound into binaural sound and transmits this convolved sound to the electronic device of the second user.

The electronic device of the first user can transmit the graphical representation and/or sound to the server that convolves the sound. Alternatively, the electronic device of the first user transmits a request to send the graphical representation and/or sound to the second electronic device but does not actually send the graphical representation and/or sound since the graphical representation and/or sound are stored on the server.

Consider an example in which the second user receives the sound to play, such as a recorded voice message, streaming audio, a sound clip, audio file, or other audio from the first user. When the electronic device of the second user receives this sound, a DSP in this electronic device automatically convolves the sound from mono or stereo sound into binaural sound with HRTFs of the second person (e.g. customized HRTFs). When the second user hears this sound with headphones or earphones, the sound externally localizes as binaural sound outside of and away from the head of the second user. This SLP can be, for example, a location in empty space where no tangible object exists, a location in empty space where an image exists, a location in occupied space where no electronic device exists (e.g., sound localizing to a stuffed animal, chair, or wall), or a location in occupied space where an electronic device exists (e.g., sound localizing to an electronic watch with no speakers).

Consider an example in which two users exchange text messages and emojis during an electronic communication. An electronic device of the first user transmits a talking emoji to an electronic device of the second user. The second user is busy and does not immediately view the emoji that displays on the display of the second electronic device as an unread message. Immediately upon receipt of the emoji and without a command or instruction from the second user, a digital signal processor (DSP) in the electronic device of the second user convolves or processes the sound of the emoji from mono sound or stereo sound into binaural sound. After this convolution occurs, the second user is no longer busy, and clicks or activates the talking emoji which causes a voice of the first user to say "Give me a call." This voice externally localizes about one meter outside of and away from the head of the second user.

The sound can be obtained or generated in a variety of ways. By way of example, a computer or electronic device generates the sound (computer-generated sound), or microphones capture and record the sound to be sent. For example, one or more microphones capture the sound as mono sound or stereo sound when the first user speaks a message or a voice call to the second user. As another example, the first electronic device or a server in communication with the first electronic device includes a plurality pre-recorded or previously generated sounds that will play to the second user.

The sound can be stored in memory of an electronic device, obtained from memory of an electronic device (such as a computer or server), and/or transmitted or streamed over one or more networks.

Consider an example in which the first electronic device executes a mobile software messaging application that includes hundreds or thousands of sound clips or sound files in mono or stereo sound. The first electronic device obtains or has access to these sound clips or sound files and can send them to other users of the mobile software messaging application. The electronic device, however, may not have permission or access to HRTFs of the other users. Hence, the electronic device sends the sounds to the other users in mono sound or stereo sound.

Consider an example in which the first electronic device obtains the sound when the first user speaks into microphones in the first electronic device or in communication with the first electronic device. The microphones records the voice of the first user as he or she records a message or sound to be played to the second user. The first user sends the sound (with or without a graphical representation) to the second user. For example, the first user sends the actual sound file or a link or network location to the sound. For instance, the second electronic device receives the network location, navigates to the location, retrieves the sound, and convolves the sound into binaural sound for the second user. The second electronic device convolves the sound and changes it from mono or stereo sound into binaural sound for playing to the second user before the second user commands or instructs the electronic device to do so.

Consider an example in which the first and second users talk to each other during an electronic call, telephony call, or telephone call (e.g., a Voice over Internet Protocol or VoIP call). One or more microphones in or in communication with the electronic device of the first user capture the voice of the first user. The voice transmits over the Internet as mono sound or stereo sound to the electronic device of the second user. The electronic device of the second user convolves the sound into binaural sound before the second user requests to hear the sound. In fact, convolution of the sound can occur before the second user is even aware that he or she received sound from the first user. Alternatively, a server in communication with both electronic devices convolves the sound. For instance, the voices first transmit to the server that convolves the sound and forwards the convolved sound to the electronic device of the receiving party.

The electronic device of the second user (or another electronic device) obtains and/or retrieves the head-related transfer functions (HRTFs) used for convolution (e.g., retrieves the HRTFs of the second user). For example, the electronic device retrieves or receives the HRTFs of the second user from memory, such retrieving them from the second electronic device, from a server, from a database, from a network location, etc.

The HRTFs can be generic HRTFs, customized HRTFs, or HRTFs that are customized to the listener. Customized HRTFs or HRTFs that are customized to the listener are specific to an anatomy of a particular listener and are based on a size and/or shape of the head and/or ears of the listener. Customized HRTFs can be obtained from actual measurements (e.g., measuring HRIRs and/or BRIRs from a head of the user) or from computational modeling (e.g., modeled from a photo of the user or modeled from measurements or approximations of the listener, such as a size and/or shape of the listener's head or ears). Customized HRTFs are also known as individualized HRTFs.

Generic HRTFs are not specific to an anatomy of the listener. Generic HRTFs can be obtained from actual measurements (e.g., measuring HRIRs and/or BRIRs from a head of the user or a dummy head) or from computation modeling. Generic HRTFs can work for a large group of people since these HRTFs are not customized or individualized to each person. These HRTFs are often stored in public databases and available to the generally public to use free of charge.

Figure 2:
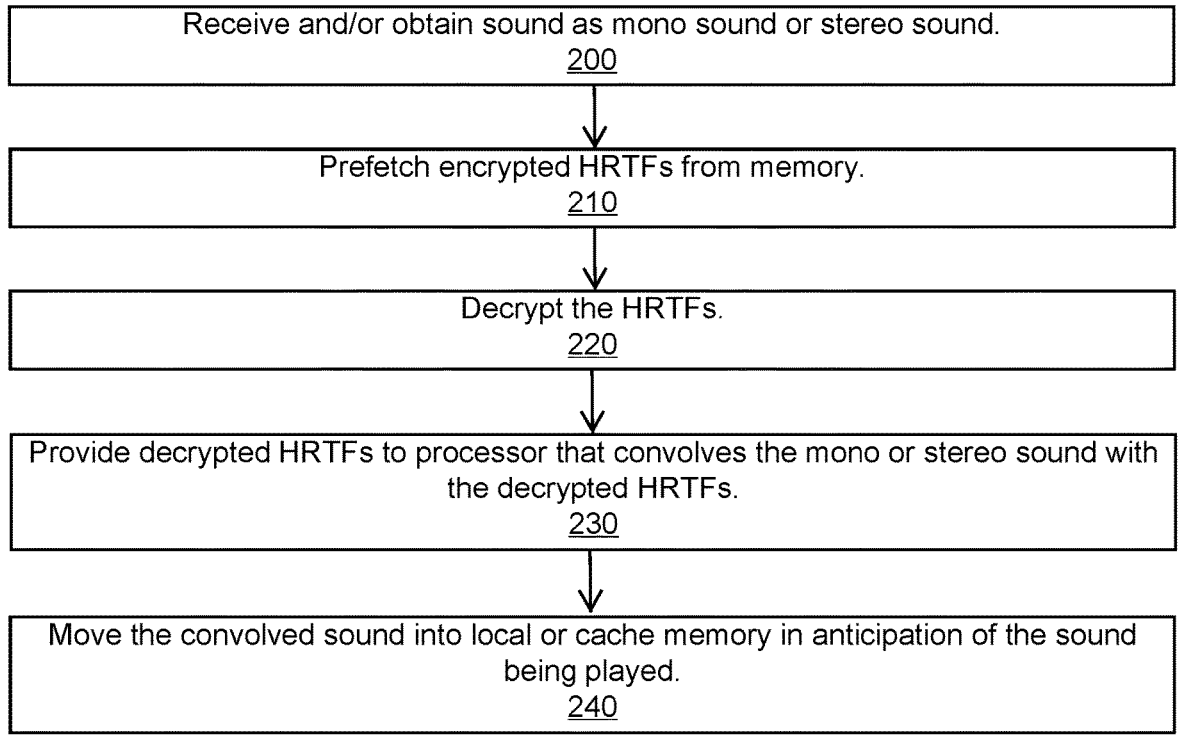
FIG. 2 is a method that expedites playing of sound to a user by prefetching, decrypting, and/or caching the sound before the sound is played to the listener in accordance with an example embodiment.

FIG. 2 is a method that expedites playing of sound to a user by prefetching, decrypting, and/or caching the sound before the sound is played to the listener in accordance with an example embodiment.

In an example embodiment, blocks discussed in connection with FIG. 2 can execute before a user, computer, or software program requests playing of the sound or activates the sound to play (e.g., opens or executes a sound file, activates a graphical representation, etc.). For example, one or more of the blocks execute before the user hears or listens to the sound or requests to do so. Further, the user may not know or be aware of the sound (e.g., the user receives sound to play from another user via a mobile messaging application but has not logged into or checked the application to see the received sound). Thus, the second user is not aware that he or she has a message waiting or sound waiting to hear.

Block 200 states receive and/or obtain sound as mono sound or stereo sound.

For example, an electronic device receives or obtains the sound from local memory (e.g., memory on the electronic device), local storage (e.g., memory directly attached to the electronic device), remote storage (e.g., memory accessed over the Ethernet or wireless network), a server, a database, a data center, etc.

For example, a first PED sends mono or stereo sound to a second PED over a wireless network (e.g., a cellular network or the Internet). As another example, the electronic device of the user obtains or retrieves the sound in anticipation of the second user requesting to hear or play the sound.

Block 210 states prefetch encrypted HRTFs from memory.

The sound can be stored and encrypted. For example, the data (e.g., HRTFs, HRIRs, etc.) are encrypted so that only a user, computer, or software program with a secret key (e.g., a decryption key) or password can read the data. Encrypted data is also ciphertext, and unencrypted data is plaintext. Encryption includes asymmetric encryption (or public key encryption) and symmetric encryption.

The HRTFs are encrypted to protect the confidentiality of the data so unwanted third parties cannot access and/or decrypt the data. Encryption thus protects confidentiality of a user's HRTF (e.g., customized HRTFs that are unique to the user).

Generally, each user wants to control who or what has access to the HRTFs of the user. This enables each user to determine what entities can access the HRTFs of the user, especially customized HRTFs since these are unique to each user. Users can input or provide this information about which entities have or do not have access to the HRTFs. This information can also be input or provided with an electronic device or software program. For example, a software program automatically gathers and inputs or updates this information.

Data can be encrypted with an encryption algorithm and encryption key to generate the ciphertext and then stored in memory. For example, symmetric cryptography uses a same key to both encrypt and decrypt the data, while asymmetric cryptography uses two different keys (e.g., one public key and one private key) to encrypt the data.

Prefetching the data occurs when the computer performs fetch operations whose result is expected to be needed soon. The prefetch occurs before the data is known to be needed. Examples of prefetching include cache prefetching and prefetch input queue (PIQ).

Cache prefetching occurs when the processor increases execution by fetching instructions or data from one storage or memory location to a faster storage or memory location before the instructions or data are actually needed. For example, the data is fetched from main memory into local cache memory where it remains until it is needed or required. The data or instructions can be accessed from the cache memory faster than the main memory.

Cache prefetching can occur via hardware and/or software. For example, hardware prefetching occurs when the processor (or a dedicated hardware mechanism in the processor) watches a stream of instructions or data being requested by the executing program, recognizes the next few elements that the program might need based on this stream, and prefetches these elements (data or instructions) into the cache memory of the processor. Software prefetching occurs when the compiler or processor analyzes code and inserts an additional prefetch instruction into the program during compilation.

PIQ includes fetching the instruction opcodes from program memory before or in advance of their need or request. Fetching the opcodes in advance or prior to their need or request for execution increases the overall efficiency of the processor by boosting its execution speed. The processor is not required to wait for the memory access operations for the next instruction opcode to finish.

Block 220 states decrypt the HRTFs.

Decryption is the process of transforming data that has been encrypted back to its unencrypted form or state. Decryption is generally the reverse process of encryption. The computer or processor executes to extract and convert the encrypted or garbled data into a readable or understandable version. The data can be decrypted with a decryption algorithm based, for example, on symmetric or asymmetric cryptography. For example, data is decrypted with a secret key or password.

Block 230 states provide decrypted HRTFs to processor that convolves the mono or stereo sound with the decrypted HRTFs.

Once the HRTFs are decrypted, the sound is convolved with the HRTFs to transform the sound in binaural sound for the listener.

Block 240 states move the convolved sound into local or cache memory in anticipation of the sound being played.

In anticipation of the binaural sound being requested or played, the binaural sound is moved into local memory or cache memory. When a request for the sound occurs, convolution is not necessary since the sound was previously convolved in anticipation of the request to play or hear the sound.

In an example embodiment, a preprocessor executes or processes the data to expedite playing, providing, or processing the binaural sound. A preprocessor is a program that processes the retrieved data to produce output that is used as input to another program. This output is generated in anticipation of the use of the output data. For example, an example embodiment executes instructions that predict a likelihood of requiring the output data and preprocesses the data in anticipation of a request for the data. For instance, the program retrieves one or more files containing HRTF pairs and extracts data from the files that will be used to convolve the sound to localize at a location corresponding to the HRTF pair data. This extracted or preprocessed data can be quickly provided to a DSP in the event sound is convolved with the HRTF pair.

As another example, the processor requests a data block (or an instruction block) from main memory before the data block is actually needed. The data block is placed or stored in cache or local memory so the data is quickly accessed and processed to externally localize sound to the user. Prefetching of this data reduces latency associated with memory access.

Prefetching, preprocessing, decrypting, and/or caching the HRTFs can occur or commence upon execution of an event. When the event occurs, prefetching, preprocessing, decrypting, and/or caching commences (e.g., execute one or more blocks associated with the methods discussed herein). Examples of these events include, but are not limited to, one or more of the following: when the user opens a software program (e.g., a mobile messaging application or other software program that enables electronic communication, such as telephone calls and/or messaging), when the user focuses, maximizes, or brings a window to the foreground (e.g., a mobile messaging application or other software program that enables electronic communication), when an electronic device receives a graphical representation from another user or another electronic device (e.g., a first user sends a second user an emoji), when an electronic device receives sound from another user or another electronic device (e.g., a first user sends mono or stereo sound to a second user), when an electronic device receives a voice message (e.g., an electronic device of the first user receives a voice message or voice mail from a second user), when the user dons or turns on headphones or earphones (e.g., this event signifies the user may want to hear binaural sound), when the user records sound with an electronic device, when the user sends sound with an electronic device, when the user dons or turns on a wearable electronic device (e.g., the user dons electronic glasses or a head mounted display), when the user clicks or activates an icon or graphical representation, when the user enters a virtual reality (VR) location (e.g., the user enters a VR chat room), when the user receives or initiates a telephone call or chat or other electronic communication, when the user records a video or captures a photograph with a camera, when the user, electronic device, or software program takes another action that indicates or anticipates binaural sound will be played or requested.

Consider an example in which a mobile messaging software application monitors incoming messages. When the application receives an incoming sound file or audio file (e.g., a WAV file, MP3 file, WMA file, MPEG file, or other audio file format), the application retrieves or obtains the HRTFs of the user who received the audio file and convolves the audio file into binaural sound. Thus, the act of receiving the audio file automatically triggered, caused, or initiated the retrieval of the HRTFs, convolution of the sound, or another action (e.g., discussed in FIG. 2 or 3).

Consider an example in which a user dons a head mounted display (HMD) and enters a virtual office. A light blinking on a virtual voice message machine notifies the user that he or she has voice message. The voice message was previously received in mono sound. In anticipation of the user activating or requesting to listen to the voice message, the software application executing the virtual office prefetches the HRTFs of the user and convolves the mono sound into binaural sound that will localize to an image of the sender if and when the user activates the voice message. In this example, the act of the user entering the virtual office or the user looking at the blinking light of the voice message machine initiated the actions of prefetching the HRTFs and convolving the sound.

Figure 3:
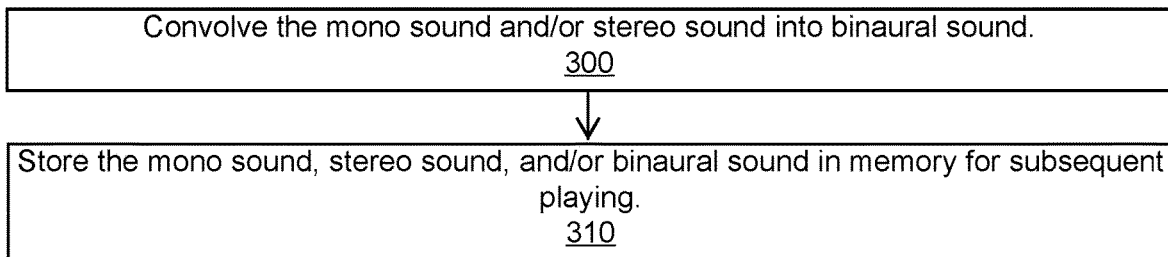
FIG. 3 is a method that expedites playing of sound to a user by storing multiple versions of the sound in memory in accordance with an example embodiment.

FIG. 3 is a method that expedites playing of sound to a user by storing multiple versions of the sound in memory in accordance with an example embodiment.

Block 300 states convolve the mono sound and/or stereo sound into binaural sound.

A processor (such as a DSP) convolves the mono sound and/or stereo sound into binaural sound as discussed herein.

Block 310 states store the mono sound, stereo sound, and/or binaural sound in memory for subsequent playing.

Multiple versions of the sound are simultaneously stored in memory. These versions include mono sound, stereo sound, and/or binaural sound. Storing multiple versions of the same sound expedites playing of the sound to the user. For example, if the user requests to hear the sound as binaural sound, then the sound is already convolved and/or stored and ready for immediate playing. If the user requests to hear stereo sound, then the sound is already processed and/or stored and ready for immediate playing. Likewise, if the user requests to hear mono sound, then the sound is already processed and/or stored and ready for immediate playing.

A graphical representation can include or be associated with sound. For example, sound plays to the user when the user, an electronic device, or a software program activates the graphical representation or the sound associated with the graphical representation.

Consider an example in which two users execute a mobile messaging software application. The first user sends the second user an animated emoji (or animoji) that when activated or executed says "Hello" in binaural sound to the second user.

By way of example, sound can localize to the listener as mono sound or stereo sound when the sound is not convolved and played to the listener with headphones, earphones, etc. Mono sound and stereo sound can also externally localize to speakers, such as speakers in a smartphone, stereo speakers in a room, etc. Alternatively, sound externally localizes to the listener when the sound is convolved into or captured as binaural sound or 3D sound. Binaural sound externally localizes outside or away from the head of the listener and is not required to localize to a physical object, such as a speaker. For instance, binaural sound can externally localize one or more meters away from a person at a location in empty space (e.g., where no speaker exists or no physical or tangible object exists). Binaural sound can also localize to physical objects that do not have an electronic speaker, such as localizing to a wall or a chair. Sound can also localize as a mix of binaural, mono, and stereo sounds, such as sound commencing as binaural sound then transitioning to stereo sound to the listener.

If the sound is mono sound or stereo sound and not subsequently convolved with HRTFs or other sound localization information (SLI), then the sound will not externally localize as binaural sound. For instance, a user receives a graphical representation and sound recorded in mono or stereo sound.

In an example embodiment, a sound file, sound clip, streaming sound, a recording, or other type of sound associates with or corresponds to a graphical representation. Binaural sound plays to the listener when the graphical representation activates.

In an example embodiment, a user, a listener, a program or software application, or an electronic device activates the graphical representation and/or causes the binaural sound to play to the listener.

For example, the listener interacts with a user interface and provides a command or instruction to play the sound upon receiving the graphical representation. For instance, the user performs one or more actions that include, but are not limited to, clicking or activating an icon, emoji, graphical representation, or other indicia that represents a sound clip, sound file, streaming sound, or recording, selecting the sound from a menu (such as a dropdown menu), selecting the sound from a folder or file (such as a folder or file being displayed to the first user), providing a body gesture (such as a hand gesture or hand movement indicating a desire to play the sound), providing head movement or eye movement (such as the listener moving his or her head in a certain direction or pattern to indicate selection of the sound), providing a voice command (such as the listener speaking an instruction at a natural language user interface), or taking another action to have the sound played to the listener.

As another example, the sound automatically plays. For instance, the sound plays when the listener receives the graphical representation, opens the software program providing the graphical representation, or views the graphical representation on a display. This sound was previously convolved in anticipation of the action occurring to play the sound.

As another example, the sound plays when a sender of the sound (e.g., another user in an electronic communication with the listener) activates the sound or designates when the sound plays.

Binaural sound is provided to the listener through one or more electronic devices including, but not limited to, one or more of headphones, earphones, earbuds, bone conduction devices, or other electronic devices with speakers at, in, or near the ears of the listener. Binaural sound can be processed for crosstalk cancellation and provided through speakers separate or away from the listener (e.g., dipole stereo speakers). Electronic devices in communication with headphones, earphones, and earbuds can provide binaural sound to the listener (e.g., a smartphone in wireless communication with earphones).

Various types of electronic devices can include or be in communication with speakers to provide binaural sound to listeners. Examples of these electronic devices include, but are not limited to, wearable electronic glasses, smartphones, head mounted displays (HMDs), optical head mounted displays (OHMDs), wearable electronic devices (WEDs), portable electronic devices (PEDs), handheld portable electronic devices (HPEDs), laptop computers, tablet computers, desktop computers, and other electronic devices.

From the point-of-view of the listener, the sound originates or emanates from an object, point, area, or direction. This location for the origin of the sound is the sound localization point (SLP). By way of example, the SLP can be an actual point in space (e.g., an empty point in space 1-2 meters away from the head of the listener) or a point on or at a physical or virtual object (e.g., a mouth or head of an augmented reality (AR) or virtual reality (VR) image). The SLP does not have to be so precise since humans are not always able to localize sound to a particle point. As such, the SLP can also be a specific or general area (e.g., a location next to and on the right side of the listener) or a specific or general direction from where the sound originates to the listener (e.g., a location several meters behind the listener).

When binaural sound is provided to the listener, the listener will hear the sound as if it originates from the sound source, the source of sound, or the SLP. The sound, however, does not originate from the sound source since the sound source or SLP may be an inanimate object with no electronics or an animate object with no electronics. Alternatively, the sound source or SLP has electronics but does not have the capability to generate sound (e.g., the sound source has no speakers or sound system). As yet another example, the sound source or SLP has speakers and the ability to provide sound but is not providing sound to the listener. In each of these examples, the listener perceives the sound to originate from the sound source or SLP, but the sound source or SLP does not produce the sound. Instead, the sound is altered or convolved and provided to the listener so the sound appears to originate from the sound source or SLP.

In an example embodiment, at least a portion of the sound associated with, corresponding to, or provided from the graphical representation externally localizes away from the head of the listener in empty space (e.g., where no physical or tangible object exists) or occupied space. For example, the sound externally localizes proximate or near the listener, such as localizing within a few meters of the listener. For instance, the SLP where the listener localizes the sound is stationary or fixed in space (e.g., fixed in space with respect to the user, fixed in space with respect to an object in a room, fixed in space with respect to an electronic device, fixed in space with respect to another object or person).

By way of example, the SLP can be an actual point in space (e.g., an empty point in space 1-2 meters away from the head of the listener) or a point on a physical or virtual object (e.g., a mouth or head of an augmented reality (AR) or virtual reality (VR) image). The SLP does not have to be so precise since humans are not always able to localize sound to a particle point. As such, the SLP can also be a general area (e.g., a location next to and on the right side of the listener) or a general direction from where the sound originates to the listener (e.g., a location several meters behind the listener).

Consider an example in which the graphical representation is an emoji that includes a talking animated animal head or human head. When a listener clicks on or activates the emoji, the head talks and the listener hears the voice as binaural sound that externally localizes about one meter away from the listener. For instance, the voice is convolved with head-related transfer functions (HRTFs) having spherical coordinates (distance r=1.0 m, elevation $\phi=0°$, azimuth $\theta=$) 30°. The listener activates the emoji and hears the voice originate from spherical coordinates (1.0, 0°, 30°).

By way of example, a computer or electronic device generates the sound (computer-generated sound), or microphones capture and record the sound to be sent. For example, one or more microphones capture the sound as mono sound or stereo sound when the first user speaks a message to the second user. As another example, the first electronic device or a server in communication with the first electronic device includes a plurality pre-recorded or previously generated sounds.

Consider an example in which the first electronic device executes a mobile software messaging application that includes hundreds or thousands of sound clips or sound files. The first electronic device obtains or has access to these sound clips or sound files and can send them to other users of the mobile software messaging application.

Consider an example in which the first electronic device obtains the sound when the first user speaks into microphones in the first electronic device or in communication with the first electronic device. The microphones records the voice of the first user as he or she records a message or sound to be played to the second user.

The first electronic device transmits the sound and a graphical representation associated with or corresponding to the sound over one or more wired or wireless networks (e.g., a cellular network, the internet, etc.). For example, the first electronic device includes a wireless transmitter/receiver that sends the sound and graphical representation.

Consider an example in which the first user commands or instructs the sound clip to play to the second user during an electronic communication between the first and second users. In response to this command or instruction, the first electronic device transmits the sound clip and a 3D moving emoji to the second electronic device.

In another example embodiment, a server or another electronic device transmits the sound and/or graphical representation to the second electronic device. Consider an example in which the first and second users talk or message each other with a mobile messaging software application. The application executes on the electronic devices and one or more servers. When the first user clicks on a 3D sound emoji, this action causes one of the servers to transmit the 3D emoji and sound to the second electronic device which receives and convolves the sound before the second user requests to hear the sound.

The second electronic device receives the sound and the graphical representation from the first electronic device or another electronic device (e.g., a server) in communication with the first electronic. For example, the second electronic device includes a wireless transmitter/receiver that receives the sound and graphical representation over one or more networks.

A processor or sound hardware processes or convolves the sound with head-related transfer functions (HRTFs) or other SLI so the sound will externally localize as binaural sound to the listener.

Graphical representations can have many sizes, shapes, and forms (e.g., people, faces, characters, animals, objects, 2D, 3D, etc.). Further, the graphical representations can be static, such as a 2D or 3D emoji that do not move or change facial expressions. Alternatively, the graphical representations can be dynamic, such as 2D or 3D emoji that move, talk, change facial expressions, rotate, etc. Further yet, graphical representations in accordance with example embodiments can be presented as AR images and VR images.

The graphical representations can include or be associated with sound, such as a sound clip, a sound file, a recorded voice message, streaming audio, etc. The sound can play for a short period of time (e.g., less than one second, one second, two seconds, etc.). For example, the sound is a voice saying "Hello" or "Hahahaha" or "Thank you" or another short audio message. As another example, the sound is a computer-generated "Beep" or phone ringing or explosion sound. The sound can play for longer periods of time (e.g., ten seconds, thirty seconds, one minute, several minutes, etc.). For example, the sound is a recorded message from a user during an electronic communication between two users.

By way of example, the sound plays when the listener activates the graphical representation or another action occurs that initiates or activates playing of the sound. For example, a first user sends a second user an emoji shaped like a heart. This heart appears on a display of an electronic device of the second user. When the second user clicks on the heart, a voice in binaural sound says "I love you" to the second user.

When sound is already convolved into binaural sound, this sound can be converted back into mono or stereo sound or played as mono or stereo sound. For example, the electronic device plays the sound through a single speaker. As another example, the electronic device plays the same channel through both speakers (e.g., play the left channel sound to both the left and right speakers of the headphones or play the right channel sound to both the left and right speakers of the headphones). As another example, the sound is filtered through cross-talk canceling filters. Filters, for example, can eliminate crosstalk and the HRTFs (e.g., by utilizing an inverse filter, such as a Nelson/Kirkeby inverse filter).

Consider an example embodiment in which a first user and a second user communicate with each via their respective electronic devices. The electronic device of the second user consults privacy settings to determine whether the first user is authorized to have access to customized HRTFs of the second user. In response to consulting these privacy settings, the electronic device of the second user denies or allows access to the customized HRTFs. For example, the electronic device denies access to the customized HRTFs of the second user when the privacy settings indicate that the first user is not authorized to have access to the customized HRTFs of the second user. For example, the electronic device allows access to the customized HRTFs of the second user when the privacy settings indicate that the first user is authorized to have access to the customized HRTFs of the second user.

Consider an example embodiment in which a first user and a second user communicate with each via their respective electronic devices. A determination is made as to whether the first user has authorization to provide binaural sound to the second user. If the first user has this authorization, then mono or stereo sound received from the first user is convolved into binaural sound and played to the second user. If the first user does not have this authorization, then the sound plays to the second user as mono sound or stereo sound.

Consider an example embodiment in which a first user and a second user communicate with each via their respective electronic devices. A determination is made as to whether the first user is authorized to provide sound to the second user in the binaural sound. The voice of the first user plays to the second user in the binaural sound when the first user is authorized to provide the sound to the second user in the binaural sound. The voice of the first user is changed from being in the binaural sound to being in one of mono sound and stereo sound when the first user is not authorized to provide the sound to the second user in the binaural sound.

Consider an example embodiment in which a first user and a second user communicate with each via their respective electronic devices. A determination is made as to whether the first user is authorized to send his or her voice to the second user in the binaural sound. The voice of the first user changes from being provided to the second user in binaural sound to being provided to the second user in one of mono sound and stereo sound upon determining that the first user is not authorized to send the voice to the second user in the binaural sound.

In an example embodiment, the electronic device display the graphical representation with one or more of the following: an indication that the sound will externally localize as binaural sound to the second user, an indication of a location where the sound will externally localize as binaural sound to the second user, and an indication informing the second user to wear headphones or earphones before listening to the sound.

FIGS. 4A-4F show a plurality of graphical representations with one or more indications in accordance with example embodiments. By way of example, the graphical representations 400A-400F are shown as faces, such as a face of an emoji, emoticon, etc. Such faces can have many shapes and forms, such as human faces, cartoon character faces, animal faces, animated faces, etc.

Example embodiments are not limited to graphical representations that include faces, such as those shown in FIGS. 4A-4F. Graphical representations can have many sizes, shapes, and forms (e.g., people, faces, characters, animals, and objects).

Furthermore, these graphical representations are shown as two-dimensional but can also be three-dimensional (3D). Further, the graphical representations can be static, such as a 2D or 3D emoji that do not move or change facial expressions. Alternatively, the graphical representations can be dynamic, such as 2D or 3D emoji that move, talk, change facial expressions, rotate, etc. Further yet, graphical representations in accordance with example embodiments can be presented as AR images and VR images.

The graphical representations 400A-400F include or are associated with a sound, such as a sound clip, a sound file, a recorded voice message, streaming audio, etc. The sound can play for a short period of time (e.g., less than one second, one second, two seconds, etc.). For example, the sound is a voice saying "Hello" or "Hahahaha" or "Thank you" or another short audio message. As another example, the sound is a computer-generated "Beep" or phone ringing or explosion sound. The sound can play for longer periods of time (e.g., ten seconds, thirty seconds, one minute, several minutes, etc.). For example, the sound is a recorded message from a user during an electronic communication between two users.

By way of example, the sound plays when the listener activates the graphical representation or another action occurs that initiates or activates playing of the sound. For example, a first user sends a second user an emoji shaped like a heart. This heart appears on a display of an electronic device of the second user. When the second user clicks on the heart, a voice in binaural sound says "I love you" to the second user.

With example embodiments, the graphical representations can represent or symbolize the listener or source of sound (depending on what instructions or understandings are provided to the listener and/or users). The graphical representations and indications are displayed to the listener on a display of a wearable electronic device (WED), portable electronic device (PED), handheld portable electronic device (HPED), head mounted display (HMD), or other electronic device discussed herein. The electronic device and display are not shown in FIGS. 4A-4F for ease of illustration. Further, these figures are shown from the point-of-view of the listener looking at the display and/or interacting with the electronic device.

Figure 4A:
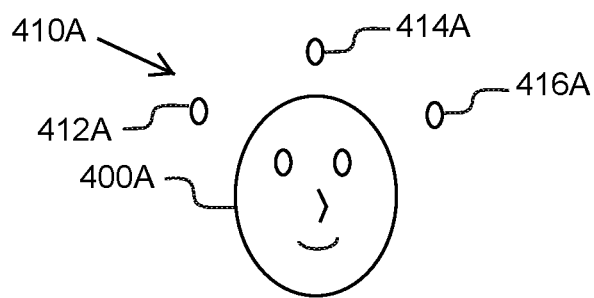
FIG. 4A is a graphical representation in accordance with an example embodiment.

FIG. 4A shows a graphical representation 400A with a visual indication 410A of a location of where binaural sound localizes. The indication includes three circles that represent SLPs near the head or face of the graphical representation which is understood to represent the head of the second user. Each circle represents a different SLP where the user can select to have binaural sound externally localize away from the head of the second user. One SLP 412A appears in front of and on a right side of the head of the graphical representation (representing the head of the second user); one SLP 414A appears in front of and above the head of the graphical representation (representing the head of the second user); one SLP 416A appears in front of and on a left side of the head of the graphical representation (representing the head of the second user).

Consider an example in which the graphical representation 400A displays on or through an electronic device of the first user (e.g., a HMD, smartphone, or wearable electronic device). The first user selects one of the indications 412A, 414A, or 416A and transmits the graphical representation 400A and mono sound to the second user during an electronic communication between the first user and the second user. When the electronic device of the second user receives the graphical representation, this electronic device extracts the coordinates of the selected SLP, selects the corresponding coordinates of HRTFs, convolves the sound with the selected HRTFs, and plays the sound to the second user as binaural sound to the location of the indication selected by the first user. For example, if the first user selected 412A, then the binaural sound originates in front of and to a right side of the head of the second user since the location of 412A displayed to the first user was in front of and to a right side of the head of the graphical representation 400A.

Alternatively, the second user selects one of the SLPs 412A, 414A, or 416A as the location where the binaural sound will localize to the second user. Further, the selected SLP can be highlighted (e.g., with color or light) to provide a visual indication on the display as to where the binaural sound will externally localize or is externally localizing to the second user.

Figure 4B:
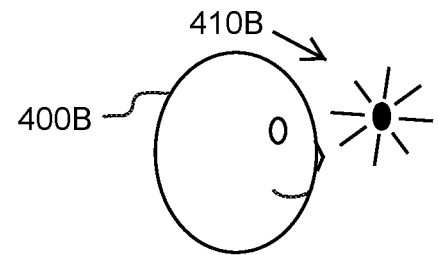
FIG. 4B is another graphical representation in accordance with an example embodiment.

FIG. 4B shows a graphical representation 400B with a visual indication 410B displayed on or with the display of the second user. The indication represents a SLP or location where binaural sound will emanate or is emanating with respect to the listener. The indication 410B is located in front of the face or head and shows a relative location where the binaural sound will originate. For example, the binaural sound will localize to a SLP that is in empty space about one meter away from the head or face of the listener as shown in FIG. 4B.

Figure 4C:
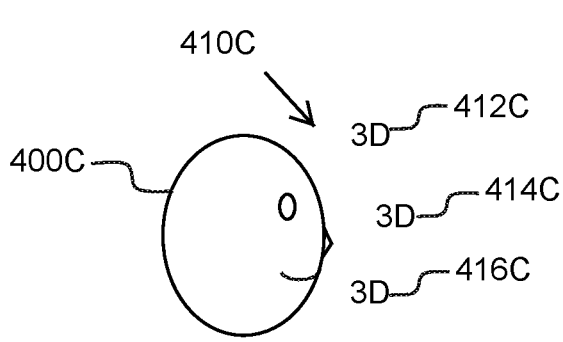
FIG. 4C is another graphical representation in accordance with an example embodiment.

FIG. 4C shows a graphical representation 400C with a visual indication 410C. The indication includes three symbols ("3D") that represent three-dimensional or binaural sound. Each 3D symbol represents SLPs near the head or face of the graphical representation which is understood to represent the head of the second user. Each 3D symbol represents a different SLP where the first or second user can select to have binaural sound externally localize away from the head of the second user. One 3D symbol 412C appears in front of and slightly above the face of the graphical representation (representing the head of the second user); one 3D symbol 414C appears directly front of the face of the graphical representation (representing the head of the second user); one 3D symbol 416C appears in front of and slightly below the face of the graphical representation (representing the head of the second user).

Consider an example in which the graphical representation 400C displays on or through an electronic device of the second user (e.g., a HMD, smartphone, or wearable electronic device). The second user sees three different locations for where he or she can select to have binaural sound localize. The 3D symbols visually inform the second user that the sound is binaural sound. The second user selects one of the indications 412C, 414C, or 416C, and sound plays to the location selected.

An example embodiment convolves the sound to each of the three SLP locations before the second user makes the selection. Since there are only a limited number of SLP locations available, the computer program knows that the second user will select one of these locations (assuming the second user desires to hear the sound as binaural sound). When the second user makes a selection of the one of the SLPs, the sound is already convolved and ready for immediate play to the second user. For example, if the second user selects 414C, then the binaural sound originates directly in front of face of the second user.

Figure 4D:
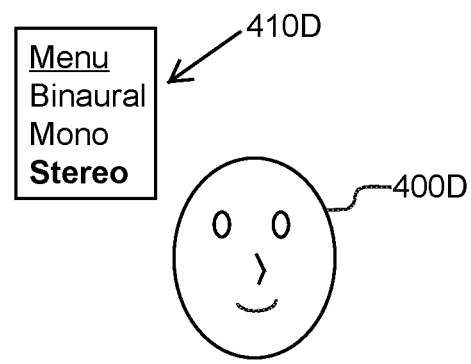
FIG. 4D is another graphical representation in accordance with an example embodiment.

FIG. 4D shows a graphical representation 400D with an indication 410D. The indication includes a menu that enables the user to select how sound will play to the listener. The menu options includes playing the sound as binaural sound, mono sound, or stereo sound. The option "stereo" sound is bolded to indicate this is the option selected by the user. Here, the user has three choices or options for how to hear the sound.

Consider an example in which the first user sends the graphical representation 400D to the second user. The first user selects the option "binaural sound" from the menu and transmits the graphical representation to the second user. When the electronic device plays the sound of the graphical representation to the second user, the second user hears the sound as binaural sound since this was the selection of the first user. The sound transmits with mono sound, but the selection of the first user causes the DSP in the electronic device of the second user to convolve the sound upon receipt before the second user requests or acts to hear the sound.

Consider an example in which the first user sends the graphical representation 400D to the second user, but the first user makes no selection (e.g., the sound is sent as mono sound with no indication how the second user will hear the sound). The graphical represent displays to the second user who can select how to hear the sound. Alternatively, a computer program makes the selection and notifies the user. For example, the selection "stereo" is bolded to indicate this is how the sound will localize to the user.

Figure 4E:
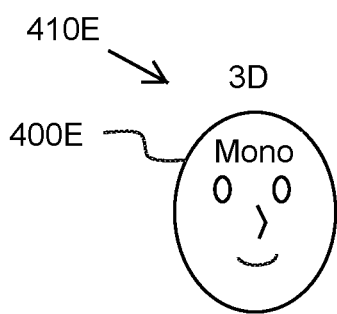
FIG. 4E is another graphical representation in accordance with an example embodiment.

FIG. 4E shows a graphical representation 400E with an indication 410E. The indication includes two options for how or where the sound will localize. One option ("3D") visually instructs the user that the sound will localize as 3D sound or binaural sound. Another option ("Mono") visually instructs the user that the sound will localize as mono sound.

Consider an example in which the first user records a voice message as mono sound and sends this voice message as the graphical representation 400E to the second user. The graphical representation is a moving 3D image of the face and head of the first user. The second user has an option to hear the sound as mono sound or binaural sound. Before making this selection, the computer program does not know which selection the second user will make. In anticipation of the second user selecting binaural sound (i.e., selecting the 3D symbol), the computer program convolves the mono sound into binaural sound. The computer program then saves both the sound as mono sound and binaural sound. If the second user subsequently selects mono sound, then the sound is ready to play to the second user. On the other hand, if the second user selects 3D sound, then the binaural sound is ready for immediate play to the second user without having to convolve the sound since the convolution already occurred.

Figure 4F:
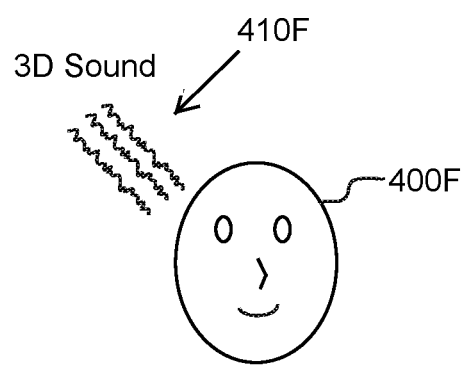
FIG. 4F is another graphical representation in accordance with an example embodiment.

FIG. 4F shows a graphical representation 400F with an indication 410F. The indication includes a sound wave (shown with three squiggly or waving lines) and the phrase "3D Sound." The indication shows the user a direction and location for the origination of the binaural sound. The user is thus able to see (in advance of hearing the sound) where the sound will originate.

The indications can thus serve as a way to visually inform users that the sound associated with the graphical representation will be binaural sound. Users learn the recognize the indication as a symbol for binaural sound. When a listener sees the indication, he or she immediately knows in advance that the sound will be binaural sound and externally localize, as opposed to mono sound or stereo sound that internally localizes inside a head of the listener.

Consider an example in which a first user and a second user talk or exchange talking graphical representations during an electronic communication. The first user sends the second user a talking emoji that displays to the second user on a HPED. This emoji is an animated head that looks like or represents the first user. So, the face of the first user appears on the display of the HPED of the second user and faces the second user. The indication also appears on this display and shows the second user that the sound will be binaural sound.

The graphical representation and/or indication provides the listener with a variety of different valuable information. Consider the example in which the graphical representation represents or symbolizes the head of the listener and is shown on a display of an HPED to the listener. First, the indication shows the listener that the sound will be binaural sound since the location of the indication is physically located outside of the head of the graphical representation. Second, the indication shows a location of where this binaural sound will initially localize to the listener because the indication is positioned relative to the graphical representation at the same relative location with respect to the second user.

The location of the source of binaural sound can appear inside the body of the graphical representation with words, text, symbols, images, or other indicia that indicate a direction and/or distance to the source of the sound. For example, the indication includes a compass heading (such as North, South, East, or West) or a coordinate location (such as coordinate location in rectangular coordinates, polar coordinates, or spherical coordinates).

In an example embodiment, the indication remains displayed with the graphical representation. For instance, while the graphical representation displays to the listener, the indication simultaneously displays to the listener. In another example embodiment, the indication displays for a temporary period of time with the graphical representation. For instance, the indication initially displays with the graphical representation to notify or inform the user of the existence and location of the source of the binaural sound. The indication then disappears while the graphical representation continues to display to the listener while the sound plays to the listener.

The indication includes the acronym or letters "3D" that stand for three-dimensional. Based on this indication, the listener expects the sound to be 3D sound or binaural sound that externally localizes to the listener.

Consider an example embodiment in which the indication is instead "Mono" or "Stereo" or another symbol or word to visually indicate that the sound will localize as or be provided as mono sound or stereo sound.

Figure 5:
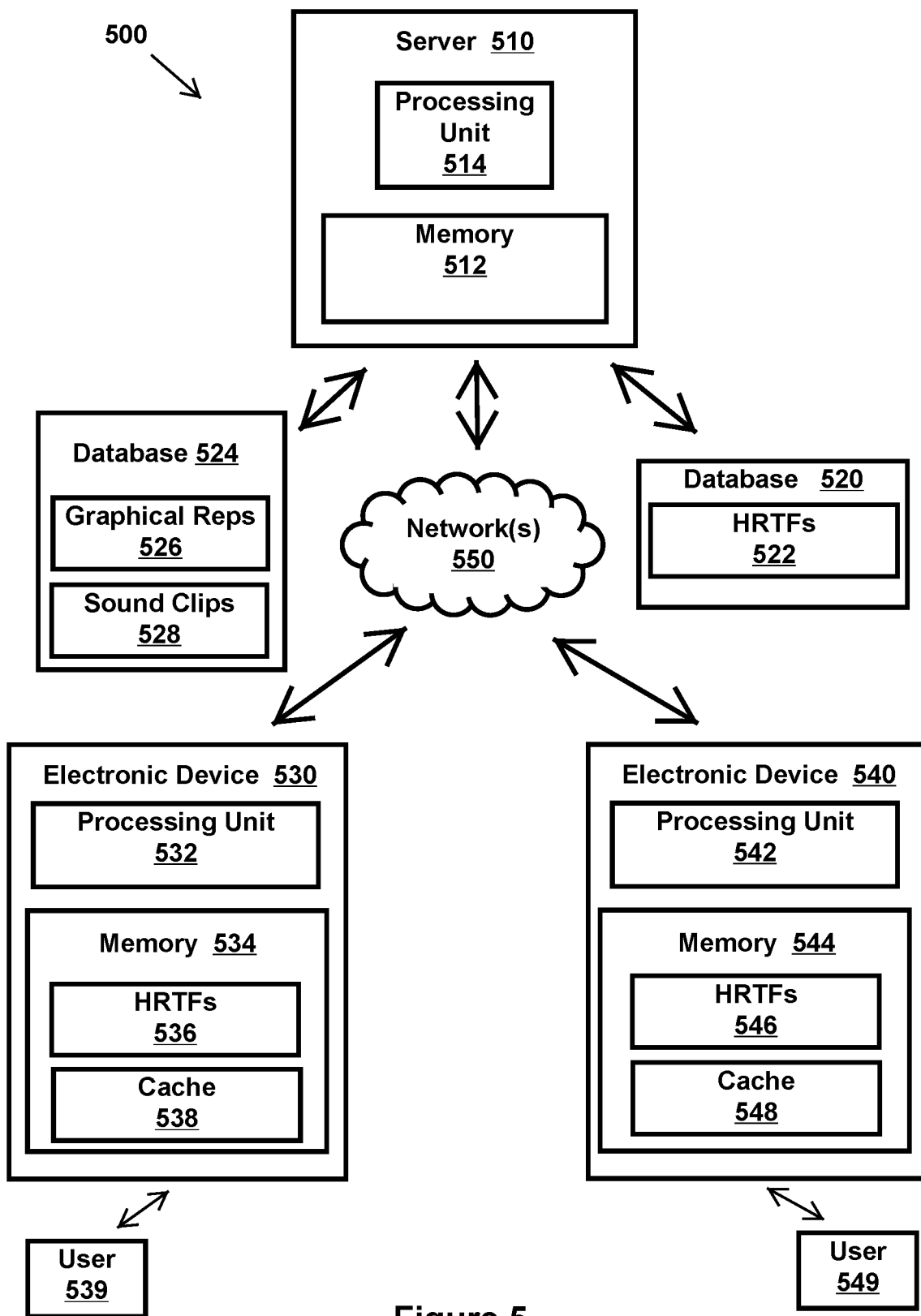
FIG. 5 is an example computer system in accordance with an example embodiment.

FIG. 5 is an example computer system 500 in accordance with an example embodiment.

The computer system 500 includes one or more of a server 510, a database 520, a database 524, an electronic device 530, and an electronic device 540 in communication over one or more networks 550. User 539 is with or uses electronic device 530, and user 549 is with or uses electronic device 540. For illustration, a single server 510, two databases 520 and 524, two electronic devices 530 and 540, and two users 539 and 549 are shown, but example embodiments can include a plurality of servers, databases, electronic devices, and users.

Server 510 includes a memory 512 and a processing unit 514. The server 510 couples to or communicates with the database 520 that includes HRTFs and other sound localization information 522 and database 524 that includes graphical representations (reps) 526 and sound clips 528.

Electronic device 530 includes a processing unit 532 and memory 534 with HRTFs 536 and cache 538.

Electronic device 540 includes a processing unit 542 and memory 544 with HRTFs 546 and cache 548.

Figure 6:
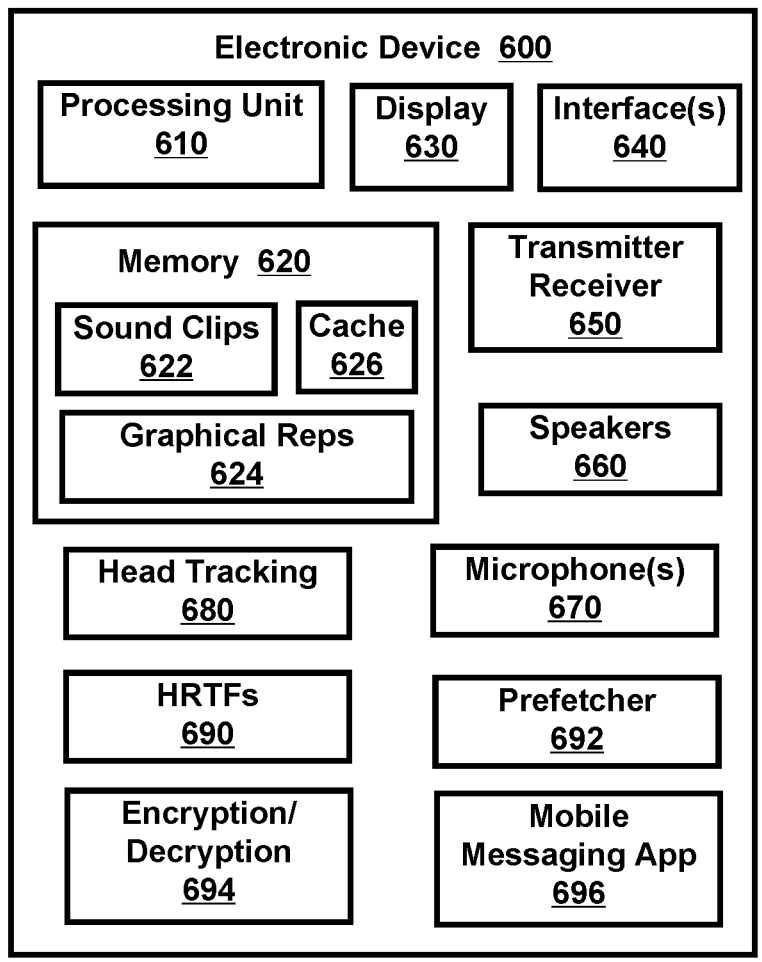
FIG. 6 is an example of an electronic device in accordance with an example embodiment.

FIG. 6 is an example of an electronic device 600 in accordance with an example embodiment.

The electronic device 600 includes a processor or processing unit 610, memory 620 with sound clips 622, graphical representations or graphical reps 624, and cache 626, a display 630, one or more interfaces 640, a wireless transmitter/receiver 750, speakers 660, one or more microphones 670, head tracking 680 (such as one or more of an inertial sensor, accelerometer, gyroscope, and magnetometer), and HRTFs 690 (which are stored in memory), a prefetcher 692 (that executes prefetching as discussed herein), encryption/decryption 694 (that encrypts and decrypts data as discussed herein), and a mobile messaging application 696.

Mobile messaging applications are applications and/or platforms that enable one or more messaging/chatting, talking, sending/receiving graphical representations, file sharing, and various other forms of electronic communication. Such application can execute on HPEDs, PED, HMDs, and other electronic devices.

Memory includes computer readable medium (CRM).

Examples of an interface include, but are not limited to, a network interface, a graphical user interface, a natural language user interface, a natural user interface, a phone control interface, a reality user interface, a kinetic user interface, a touchless user interface, an augmented reality user interface, and/or an interface that combines reality and virtuality.

Sound clips include sound files, sounds, recorded messages (such as voice messages or other recorded sound), computer-generated sounds, and other sound discussed herein. For example, users can record, exchange, and/or transmit sound clips or sounds. These sound include sending streaming sounds or sounds in real-time during an electronic communication.

The processor or processing unit includes a processor and/or a digital signal processor (DSP). For example, the processing unit includes one or more of a central processing unit, CPU, digital signal processor (DSP), microprocessor, microcontrollers, field programmable gate arrays (FPGA), application-specific integrated circuits (ASIC), etc. for controlling the overall operation of memory (such as random access memory (RAM) for temporary data storage, read only memory (ROM) for permanent data storage, and firmware).

Consider an example embodiment in which the processing unit includes both a processor and DSP that communicate with each other and memory and perform operations and tasks that implement one or more blocks of the flow diagram discussed herein. The memory, for example, stores applications, data, programs, sound clips, algorithms (including software to implement or assist in implementing example embodiments) and other data.

For example, a processor or DSP executes a convolving process with the retrieved HRTFs or HRIRs (or other transfer functions or impulse responses) to process sound clips so that the sound is adjusted, placed, or localized for a listener away from but proximate to the head of the listener. For example, the DSP converts mono or stereo sound to binaural sound so this binaural sound externally localizes to the user. The DSP can also receive binaural sound and move its localization point, add or remove impulse responses (such as RIRs), and perform other functions.

For example, an electronic device or software program convolves and/or processes the sound captured at the microphones of an electronic device and provides this convolved sound to the listener so the listener can localize the sound and hear it. The listener can experience a resulting localization externally (such as at a sound localization point (SLP) associated with near field HRTFs and far field HRTFs) or internally (such as monaural sound or stereo sound).

The memory stores HRTFs, HRIRs, BRTFs, BRIRs, RTFs, RIRs, or other transfer functions and/or impulse responses for processing and/or convolving sound. The memory can also store instructions for executing one or more example embodiments. Further, the memory can store the sound, graphical representations, and other information and instructions discussed herein.

The electronic device provides sound to the users through one or more speakers. Alternatively or in addition to the speakers, the electronic device can communicate with headphones, earphones, earbuds, bone conduction devices, or another electronic device that provides sound to the user.

The networks include one or more of a cellular network, a public switch telephone network, the Internet, a local area network (LAN), a wide area network (WAN), a metropolitan area network (MAN), a personal area network (PAN), home area network (HAM), and other public and/or private networks. Additionally, the electronic devices need not communicate with each other through a network. As one example, electronic devices couple together via one or more wires, such as a direct wired-connection. As another example, electronic devices communicate directly through a wireless protocol, such as Bluetooth, near field communication (NFC), or other wireless communication protocol.

By way of example, a computer and an electronic device include, but are not limited to, handheld portable electronic devices (HPEDs), wearable electronic glasses, electronic or smart watches, wearable electronic devices (WEDs), smart earphones or hearables, electronic devices with cellular or mobile phone capabilities or subscriber identification module (SIM) cards, desktop computers, servers, portable computers (such as tablet and notebook computers), smartphones, head mounted displays (HMDs), optical head mounted displays (OHMDs), headphones, and other electronic devices with a processor or processing unit, a memory, a DSP.

Example embodiments are not limited to HRTFs but also include other sound transfer functions and sound impulse responses including, but not limited to, head related impulse responses (HRIRs), room transfer functions (RTFs), room impulse responses (RIRs), binaural room impulse responses (BRIRs), binaural room transfer functions (BRTFs), headphone transfer functions (HPTFs), etc.

Example embodiments can be executed with one or more integrated circuits that are specifically customized, designed, or configured to execute one or more blocks discussed herein. For example, the electronic devices include a specialized or custom processor or microprocessor or semiconductor intellectual property (SIP) core or digital signal processor (DSP) with a hardware architecture optimized for convolving sound and executing one or more example embodiments.

Consider an example in which the HPED (including headphones) includes a customized or dedicated DSP that executes one or more blocks discussed herein (including processing and/or convolving sound into binaural sound for sound clips). Such a DSP has a better power performance or power efficiency compared to a general-purpose microprocessor and is more suitable for a HPED or WED due to power consumption constraints of the HPED or WED. The DSP can also include a specialized hardware architecture, such as a special or specialized memory architecture to simultaneously fetch or pre-fetch multiple data and/or instructions concurrently to increase execution speed and sound processing efficiency and to quickly correct errors while sound externally localizes to the user. By way of example, streaming sound data (such as sound data in a telephone call or software game application) is processed and convolved with a specialized memory architecture (such as the Harvard architecture or the Modified von Neumann architecture). The DSP can also provide a lower-cost solution compared to a general-purpose microprocessor that executes digital signal processing and convolving algorithms. The DSP can also provide functions as an application processor or microcontroller. The DSP can also prefetch sound clips and other sound from memory to expedite convolution.

Consider an example in which a customized DSP includes one or more special instruction sets for multiply-accumulate operations (MAC operations), such as convolving with transfer functions and/or impulse responses (such as HRTFs, HRIRs, BRIRs, et al.), executing Fast Fourier Transforms (FFTs), executing finite impulse response (FIR) filtering, and executing instructions to increase parallelism.

Consider another example in which sound clips, graphical representations, and/or HRTFs (or other transfer functions or impulse responses) are stored or cached in the DSP memory or local memory relatively close to the DSP to expedite binaural sound processing.

As used herein, "customized HRTFs" or "HRTFs that are customized" are specific to an anatomy of a particular listener and are based on a size and/or shape of the head and/or ears of the listener.

As used herein, an "emoji" is a graphical representation that includes images, symbols, or icons sent between users in electronic communications (such as text messages, e-mail, and social media) to express an emotional attitude of the writer, convey information, or communicate an message. Emojis can provide sound when activated or executed.

A "talking emoji" is an emoji that talks (e.g., with one or more words).

As used herein, "empty space" is a location that is not occupied by a tangible object.

As used herein, "graphical representations" include, but are not limited to, emoji, emoticons, animoji, icons, stickers, folders, documents, files, text or words, pictures, images, and other visible indicia that display on, thru, or with an electronic device. Furthermore, these graphical representations can be two-dimensional (2D), three-dimensional (3D), virtual reality (VR) images, augmented reality (AR) images, static or non-moving, moving, and other types of images.

As used herein, "headphones" or "earphones" include a left and right over-ear ear cup, on-ear pad, or in-ear monitor (IEM) with one or more speakers or drivers for a left and a right ear of a wearer. The left and right cup, pad, or IEM may be connected with a band, connector, wire, or housing, or one or both cups, pads, or IEMs may operate wirelessly being unconnected to the other. The drivers may rest on, in, or around the ears of the wearer, or mounted near the ears without touching the ears.

As used herein, the word "proximate" means near. For example, binaural sound that externally localizes away from but proximate to a user localizes within three meters of the head of the user.

As used herein, a "sound localization point" or "SLP" is a location where a listener localizes sound. A SLP can be internal (such as monaural sound that localizes inside a head of a listener), or a SLP can be external (such as binaural sound that externally localizes to a point or an area that is away from but proximate to the person or away from but not near the person). A SLP can be a single point such as one defined by a single pair of HRTFs or a SLP can be a zone or shape or volume or general area. Further, in some instances, multiple impulse responses or transfer functions can be processed to convolve sounds to a place within the boundary of the SLP. In some instances, a SLP may not have access to a particular HRTF necessary to localize sound at the SLP for a particular user, or a particular HRTF may not have been created. A SLP may not require a HRTF in order to localize sound for a user, such as an internalized SLP, or a SLP may be rendered by adjusting an ITD and/or ILD or other human audial cues.

As used herein, "sound localization information" or "SLI" is information that is used to process or convolve sound so the sound externally localizes as binaural sound to a listener.

As used herein, a "telephone call," or a "electronic call" is a connection over a wired and/or wireless network between a calling person or user and a called person or user. Telephone calls can use landlines, mobile phones, satellite phones, HPEDs, voice personal assistants (VPAs), computers, and other portable and non-portable electronic devices. Further, telephone calls can be placed through one or more of a public switched telephone network, the internet, and various types of networks (such as Wide Area Networks or WANs, Local Area Networks or LANs, Personal Area Networks or PANs, Campus Area Networks or CANs, etc.). Telephone calls include other types of telephony including Voice over Internet Protocol (VoIP) calls, internet telephone calls, in-game calls, telepresence, etc.

As used herein, a "user" or a "listener" is a person (i.e., a human being). These terms can also be a software program (including an IPA or IUA), hardware (such as a processor or processing unit), an electronic device or a computer (such as a speaking robot or avatar shaped like a human with microphones in its ears or about six inches apart).

In some example embodiments, the methods illustrated herein and data and instructions associated therewith, are stored in respective storage devices that are implemented as computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to a manufactured single component or multiple components.

Blocks and/or methods discussed herein can be executed and/or made by a user, a user agent (including machine learning agents and intelligent user agents), a software application, an electronic device, a computer, firmware, hardware, a process, a computer system, and/or an intelligent personal assistant. Furthermore, blocks and/or methods discussed herein can be executed automatically with or without instruction from a user.

What is claimed is:

1. A portable electronic device (PED) of a user, the PED comprising:
   a receiver that receives a talking emoji from a second PED of a second user; and
   a processor that expedites playing sound of the talking emoji to the user by processing the sound of the talking emoji with head-related transfer functions (HRTFs) to change the sound from mono sound or stereo sound into binaural sound before the user activates the talking emoji to hear the binaural sound.

2. The PED of claim 1 further comprising:
a memory that stores the HRTFs as encrypted, wherein the PED retrieves the HRTFs that are encrypted before receiving a request from the user to activate the talking emoji to hear the binaural sound, decrypts the HRTFs, and provides the HRTFs after being decrypted to a digital signal processor (DSP).

3. The PED of claim 1 further comprising:
a display that displays the talking emoji with a symbol that visually indicates that the binaural sound of the talking emoji will play to the user as the binaural sound and not as the mono sound or the stereo sound.

4. The PED of claim 1 further comprising:
a user interface that receives a click to activate playing of the talking emoji in the binaural sound, wherein the binaural sound of the talking emoji plays without further convolution after receiving the click since the processor already processed the mono sound or the stereo sound into the binaural sound before receiving the click to activate playing of the talking emoji.

5. The PED of claim 1 further comprising:
a cache memory that stores the binaural sound, wherein the PED moves the binaural sound into the cache memory before receiving a request from the user to activate the talking emoji and before playing the binaural sound of the talking emoji to the user.

6. The PED of claim 1 further comprising:
a memory that stores the HRTFs, wherein the PED expedites playing the binaural sound by retrieving the HRTFs from the memory and processing the mono sound or the stereo sound into the binaural sound in response to the user opening a mobile messaging application.

7. The PED of claim 1 further comprising:
a memory that stores the talking emoji in the mono sound or the stereo sound and simultaneously stores the talking emoji in the binaural sound so the sound of the talking emoji is playable to the second person as the binaural sound and the mono sound or the stereo sound.

8. A method comprising:
receiving, at a portable electronic device (PED) of a user, a talking emoji; and
expediting playing of sound of the talking emoji to the user by processing the sound of the talking emoji with head-related transfer functions (HRTFs) to change the sound from mono sound or stereo sound into binaural sound before the user activates the talking emoji to hear the binaural sound.

9. The method of claim 8 further comprising:
storing, in memory of the PED, the HRTFs as encrypted;
retrieving, from the memory, the HRTFs that are encrypted before receiving a request from the user to play the talking emoji;
decrypting the HRTFs before receiving the request from the user to play the talking emoji; and
providing the HRTFs that are decrypted to the processor before receiving the request from the user to play the talking emoji.

10. The method of claim 8 further comprising:
displaying, with a display of the PED, the talking emoji with a symbol that visually indicates that the sound of the talking emoji will play to the user as the binaural sound.

11. The method of claim 8 further comprising:
receiving, at the PED, a click at the talking emoji as a request from the user to play the talking emoji, wherein the PED expedites playing of the sound of the talking emoji plays as the binaural sound upon receiving the click since the processor already processed the sound from the mono sound or the stereo sound into the binaural sound.

12. The method of claim 8 further comprising:
expediting playing of the sound of the talking emoji by moving the binaural sound into cache memory in the PED before receiving a request from the user to play the talking emoji.

13. The method of claim 8 further comprising:
expediting playing of the sound of the talking emoji by moving the binaural sound of the talking emoji into cache memory of the PED in anticipation of the user subsequently activating the talking emoji to hear the sound of the talking emoji.

14. The method of claim 8 further comprising:
storing, in memory of the PED, the talking emoji in the stereo sound and the talking emoji in the binaural sound so the sound of the talking emoji is playable to the user as both the stereo sound and the binaural sound.

15. A portable electronic device (PED) of a user, the PED comprising:
a receiver that receives a talking emoji; and
a processor that expedites playing sound of the talking emoji to the user by convolving the sound of the talking emoji with head-related transfer functions (HRTFs) to change the sound from mono sound or stereo sound into binaural sound before the user activates the talking emoji to play the sound of the talking emoji.

16. The PED of claim 15 further comprising:
a memory that stores the sound of the talking emoji in the PED as the binaural sound and the mono sound or the stereo sound so the user has an option to hear the sound of the talking emoji as the binaural sound and as the mono sound or the stereo sound.

17. The PED of claim 15 further comprising:
a cache memory, wherein the PED expedites playing of the sound of the talking emoji by moving the binaural sound of the talking emoji into the cache memory in anticipation of the user subsequently activating the talking emoji to hear the sound of the talking emoji.

18. The PED of claim 15 further comprising:
a memory that stores the HRTFs, wherein the PED expedites playing the sound of the talking emoji by prefetching the HRTFs from the memory in response to opening of a mobile messaging application that receives and plays talking emojis to the user.

19. The PED of claim 15, wherein the talking emoji is a three-dimensional (3D) moving emoji that is an augmented reality (AR) or virtual reality (VR) image, and the sound of the talking emoji is a recorded voice of a message to the user from another user.

20. The PED of claim 15 further comprising:
a memory that stores the HRTFs as encrypted, wherein the PED expedites playing of the sound of the talking emoji by retrieving the HRTFs from the memory and decrypting the HRTFs in response to opening of a mobile messaging application that receives and plays talking emojis to the user.

\* \* \* \* \*